US008465036B2

(12) United States Patent
Power et al.

(10) Patent No.: US 8,465,036 B2
(45) Date of Patent: Jun. 18, 2013

(54) SIDE MOUNTED AIR SPRING TRAILING ARM SUSPENSION (75) Inventors: Michael A. Power, Troy, MI (US); Gregory D. Pavuk, Berkley, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 28 days.

(21) Appl. No.: 13/196,059

(22) Filed: Aug. 2, 2011

(65) Prior Publication Data

US 2013/0033019 A1 Feb. 7, 2013

(51) Int. Cl.
B60G 21/05 (2006.01)
B60G 9/00 (2006.01)
B60G 11/27 (2006.01)

(52) U.S. Cl.
USPC ...... 280/124.116; 280/124.153; 280/124.157; 280/789

(58) Field of Classification Search
USPC .............. 280/63, 124.116, 124.128, 124.132, 280/124.153, 124.157, 124.162, 781, 789 280/124.109; 296/204
See application file for complete search history.

(56) References Cited

U.S. PATENT DOCUMENTS

| 2,507,980 | A | * | 5/1950 | Knapp | 280/124.128 |
|---|---|---|---|---|---|
| 2,988,375 | A | * | 6/1961 | Lich | 280/6.16 |
| 2,995,355 | A | * | 8/1961 | Stump | 267/64.27 |
| 3,179,439 | A | * | 4/1965 | Janeway | 280/124.11 |
| 3,252,538 | A | * | 5/1966 | Brueder | 180/291 |
| 3,547,464 | A | * | 12/1970 | Drewitz | 280/124.116 |
| 3,704,896 | A | * | 12/1972 | Buelow | 280/81.6 |
| 3,891,231 | A | * | 6/1975 | Snoberger et al. | 280/788 |
| 4,248,455 | A | * | 2/1981 | Manning | 280/6.152 |
| 4,273,357 | A | * | 6/1981 | Pashkow | 280/124.116 |
| 4,310,171 | A | * | 1/1982 | Merkle | 280/86.75 |
| 4,344,643 | A | * | 8/1982 | Ray | 280/124.109 |
| 4,529,224 | A | * | 7/1985 | Raidel | 280/124.109 |
| 4,596,402 | A | * | 6/1986 | Raidel | 280/124.109 |
| 4,691,937 | A | * | 9/1987 | Raidel | 280/124.116 |
| 4,858,948 | A | * | 8/1989 | Raidel | 280/124.116 |
| 4,946,189 | A | * | 8/1990 | Manning | 180/349 |
| 5,039,124 | A | * | 8/1991 | Widmer | 280/124.116 |
| 5,566,971 | A | * | 10/1996 | Perlot | 280/124.109 |
| 5,944,339 | A | | 8/1999 | McKenzie et al. | |
| 6,733,020 | B2 | | 5/2004 | Reineck | |
| 6,871,864 | B2 | | 3/2005 | Reineck | |
| 6,886,840 | B2 | | 5/2005 | Reineck | |
| 7,070,177 | B2 | | 7/2006 | Pavuk | |
| 7,156,382 | B2 | | 1/2007 | Lloyd | |
| 7,618,049 | B2 | | 11/2009 | Varela et al. | |

(Continued)

OTHER PUBLICATIONS

Automotive Dictionary—'Su'—Dictionary of Automotive Terms, available at http://www.motorera.com/dictionary/SU.HTM (last visited 10/23/12).*

Primary Examiner — Joseph Rocca
(74) Attorney, Agent, or Firm — Brooks Kushman P.C.

(57) ABSTRACT

A suspension includes first and second arms that connect a rigid axle to a frame structure. The first arm has one end configured for connection to a rigid axle structure and an opposite end adapted for connection to one lateral side of the frame structure. The second arm has one end configured for connection to the rigid axle structure and an opposite end adapted for connection to an opposite lateral side of the frame structure. The suspension includes a first air spring associated with the first arm and a second air spring associated with the second arm. The first and second air springs are configured to be positioned laterally outboard of the frame structure.

27 Claims, 8 Drawing Sheets

U.S. PATENT DOCUMENTS

| | | |
|---|---|---|
| 7,669,866 B2 | 3/2010 | Peaker et al. |
| 7,775,535 B2 | 8/2010 | Bluff et al. |
| 7,967,307 B2 | 6/2011 | Reineck |
| 2005/0156462 A1* | 7/2005 | Abrat et al. ............ 301/124.1 |
| 2006/0001311 A1 | 1/2006 | Platner et al. |
| 2006/0208402 A1 | 9/2006 | Keeney et al. |
| 2007/0158925 A1 | 7/2007 | Fader et al. |
| 2008/0258361 A1 | 10/2008 | Wen et al. |
| 2008/0265475 A1 | 10/2008 | Keeney et al. |
| 2010/0276904 A1 | 11/2010 | Pavuk |

* cited by examiner

SIDE MOUNTED AIR SPRING TRAILING ARM SUSPENSION

TECHNICAL FIELD

This invention generally relates to a trailing arm suspension with a side mounted air spring configuration positioned outboard of a frame member.

BACKGROUND OF THE INVENTION

Trailer axles include a rigid axle housing or tube that extends between laterally spaced wheel ends. A suspension system connects the trailer axle to a trailer frame. In one example, a trailing arm suspension includes first and second arms that connect ends of the axle tube to first and second frame rails that are laterally spaced apart from each other. The first arm has one end fixed to the axle tube and an opposite end pivotally attached to the first frame rail. The second arm has one end fixed to the axle tube and an opposite end pivotally attached to the second frame rail. The suspension also includes air springs that dampen load inputs generated at the wheel ends. The air springs are mounted to the suspension at a location that is directly underneath the first and second frame rails.

Military trailers are subjected to unique challenges due to the harsh environment in which they operate. Suspensions for military trailers are conflicted by needing both a high suspension travel for mobility over rough ground conditions while needing a low bed height for roll stability and ease of cargo loading. Ground clearance is also a concern as the trailer must be able to operate effectively in various types of environments without interference. Further, the trailer must be very durable and not excessively heavy. Each of these concerns must be addressed in a trailer suspension design without resulting in excessive overall cost.

SUMMARY OF THE INVENTION

A suspension includes first and second arms that are configured for connection to an axle. The first arm is to be connected to one lateral side of a frame structure and the second arm is to be connected to an opposite lateral side of the frame structure. The first arm is associated with a first air spring and the second arm is associated with a second air spring. The first and second air springs are configured to be positioned laterally outboard of the frame structure.

In one example, the suspension is used with an axle assembly that includes a rigid axle structure that defines a lateral axis of rotation. The rigid axle structure has a first axle end associated with a first wheel and a second axle end associated with a second wheel that rotate about the lateral axis of rotation. A first trailing suspension arm has one end fixed to the rigid axle structure adjacent the first wheel and an opposite end adapted for connection to one lateral side of a frame structure. A second trailing suspension arm has one end fixed to the rigid axle structure adjacent the second wheel and an opposite end adapted for connection to an opposite lateral side of the frame structure. As described above, a first air spring is associated with the first trailing suspension arm, and a second air spring is associated with the second trailing suspension arm. The first and second air springs are configured to be positioned laterally outboard of the frame structure.

In one example, the rigid axle and suspension assembly is utilized with a trailer that includes a trailer frame having at least first and second side rails extending in the longitudinal direction. The first and second air springs are supported on the first and second arms laterally outboard of the first and second frame rails.

These and other features of the present invention can be best understood from the following specification and drawings, the following of which is a brief description.

DETAILED DESCRIPTION OF THE PREFERRED EMBODIMENT

Figure 1A:
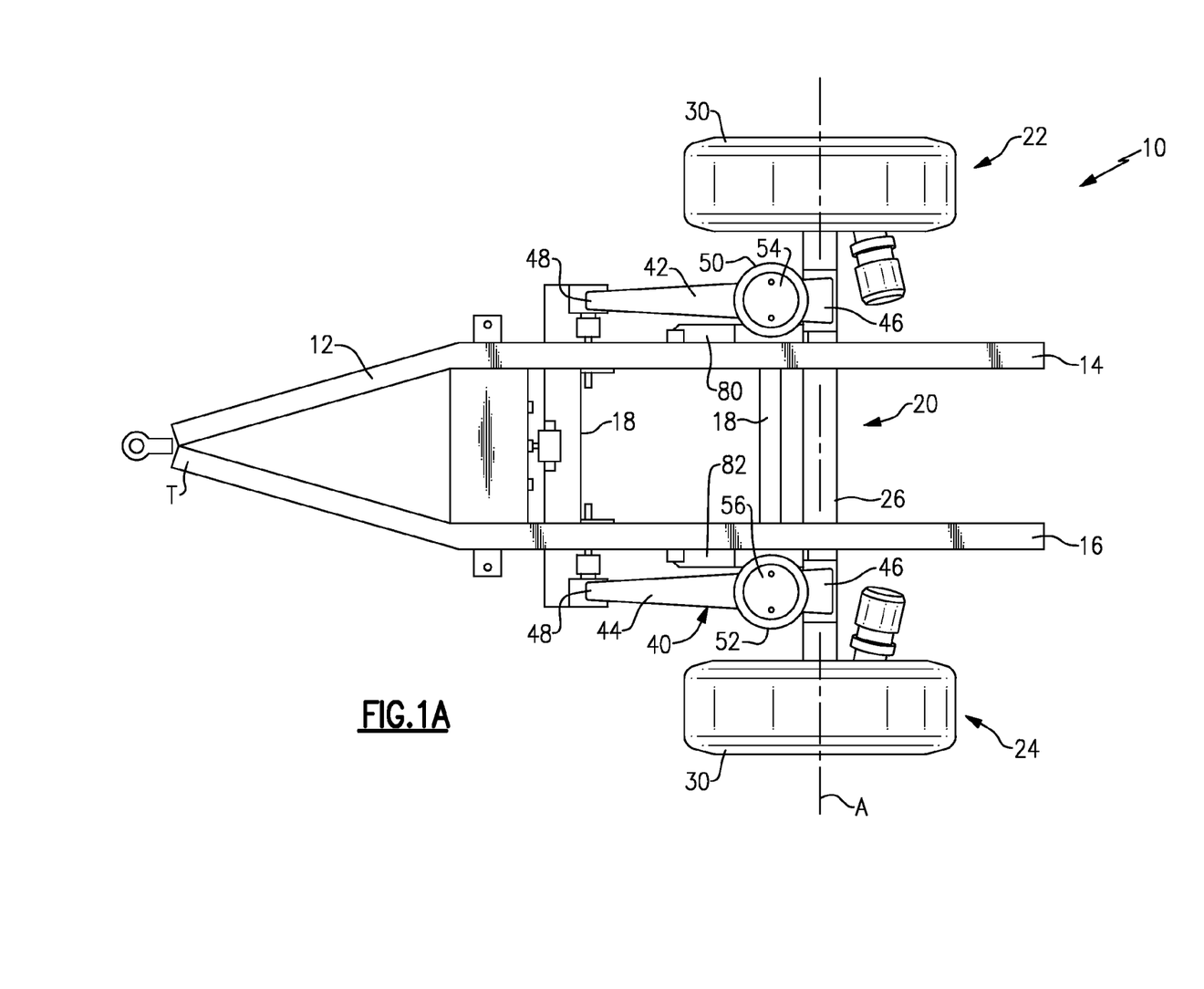
FIG. 1A is an overhead view of one example of a trailer frame and a rigid axle and suspension assembly incorporating the subject invention.

FIG. 1A shows a trailer 10 with a frame 12 having a first side rail 14 and a second side rail 16 that extend generally in a longitudinal direction along a length of the trailer 10. The trailer frame 12 includes one or more cross-rails 18 that extend generally in a lateral direction across a width of the trailer 10. The cross-rails 18 are connected at opposing ends to the first 14 and second 16 side rails. The trailer 10 also includes a tongue T configured for connection to a vehicle as known.

Figure 2:
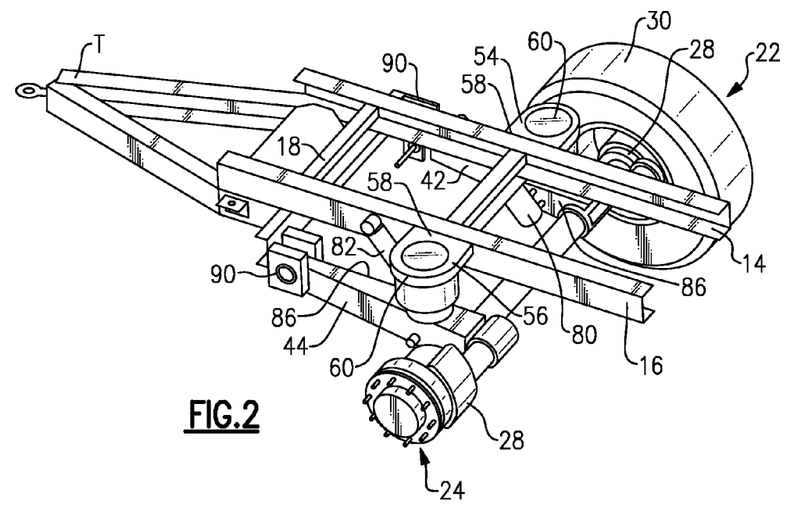
FIG. 2 is a perspective view from the rear of the trailer frame of FIG. 1A with one tire removed for purposes of clarity.

A rigid axle 20 includes first 22 and second 24 wheel assemblies that are laterally spaced apart from each other. The rigid axle includes an axle housing or axle tube 26 having one axle end mounted to the first wheel assembly 22 and an opposite axle end mounted to the second wheel assembly 24. The axle tube 26 defines an axis of rotation A about which the first 22 and second 24 wheel assemblies rotate. Each wheel assembly 22, 24 includes a brake assembly (schematically indicated at 28 in FIG. 2) and a tire 30. Only one tire 30 is shown in FIG. 2 for purposes of clarity.

A suspension assembly 40 is used to connect the rigid axle 20 to the frame 12. The suspension assembly 40 comprises a trailing arm, top mounted configuration. The suspension assembly 40 includes a first arm 42 and a second arm 44 that extend generally in a longitudinal direction. Each arm 42, 44 includes a first arm end 46 that is fixed to the axle tube 26 and a second arm end 48 that is pivotally connected to the frame 12.

In one example configuration, the second arm ends 48 of the first 42 and second 44 arms are mounted to one of the cross-rails 18. In this configuration, the first 42 and second 44 arms are generally parallel to the first 14 and second 16 side rails. In an optional arrangement, the second arm ends 48 of the first and second arms can be mounted directly to the first 14 and second 16 side rails, as indicated schematically at 42', 44' in FIG. 1B. In this configuration, the second arm ends 48 of the first 42' and second 44' arms are divergent towards each other and are non-parallel to the first 14 and second 16 side rails.

The suspension assembly 40 includes first 50 and second 52 air springs that are respectively associated with the first 42 and second 44 arms. The air springs 50, 52 are mounted on the first 42 and second arms 44 outboard of the first 14 and second 16 side rails such that the first air spring 50 is located laterally between the first wheel assembly 22 and the first side rail 14 and the second air spring 52 is located laterally between the second wheel assembly 24 and the second side rail 16. The term "outboard" refers to a direction that is facing away from a center of the trailer and the term "inboard" refers to a direction that is facing toward the center of the trailer.

Figure 1B:
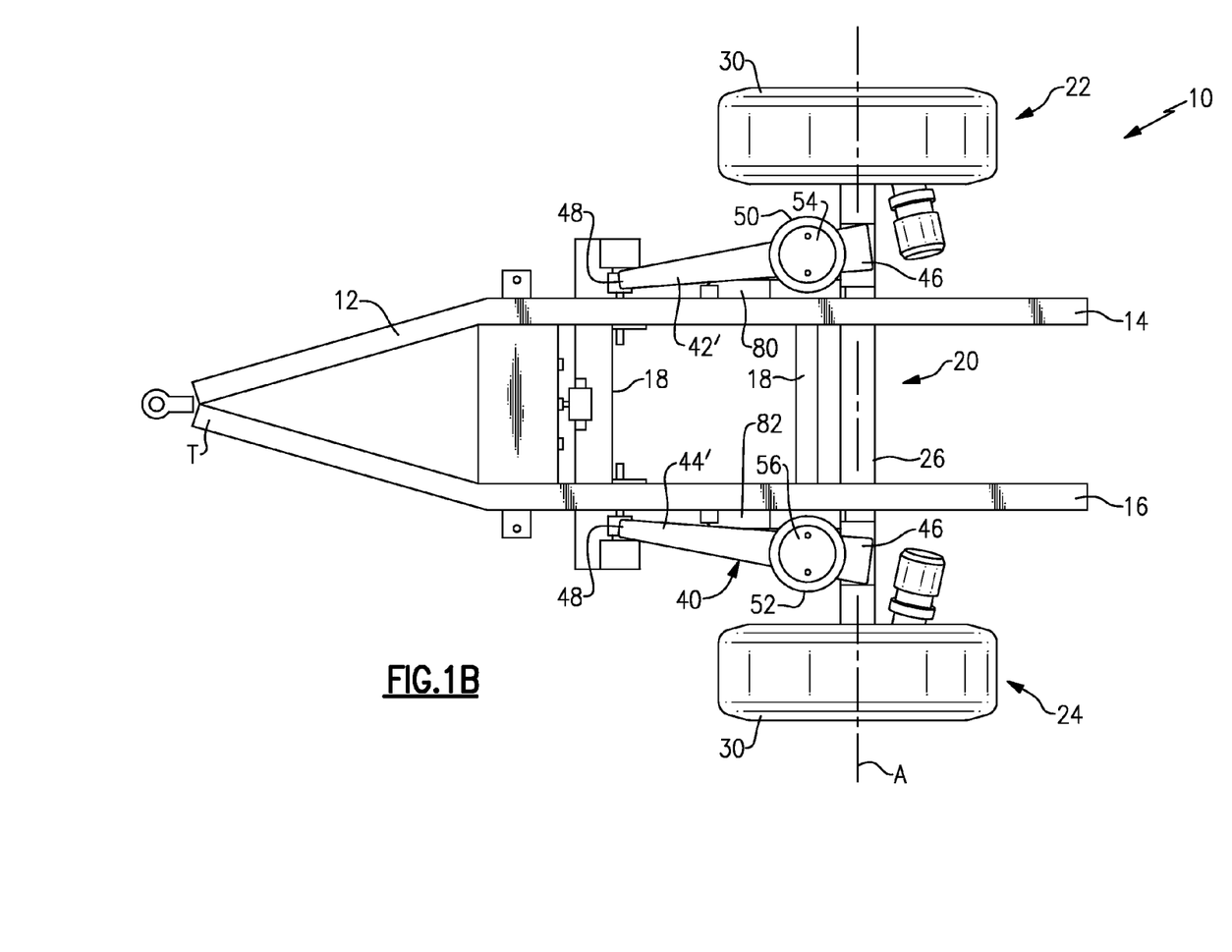
FIG. 1B is an overhead view of another example of a trailer frame and a rigid axle and suspension assembly incorporating the subject invention.

As shown in FIGS. 1 and 2, a first cantilevered bracket 54 is mounted to the first side rail 14 and extends in an outboard direction toward the first wheel assembly 22. A second cantilevered bracket 56 is mounted to the second side rail 16 and extends in an outboard direction toward the second wheel assembly 24. Inboard ends 58 of the first 54 and second 56 cantilevered brackets are respectively fixed to the first 14 and second 16 side rails, while outboard ends 60 of the first 54 and second 56 cantilevered brackets are unsupported.

Figure 4:
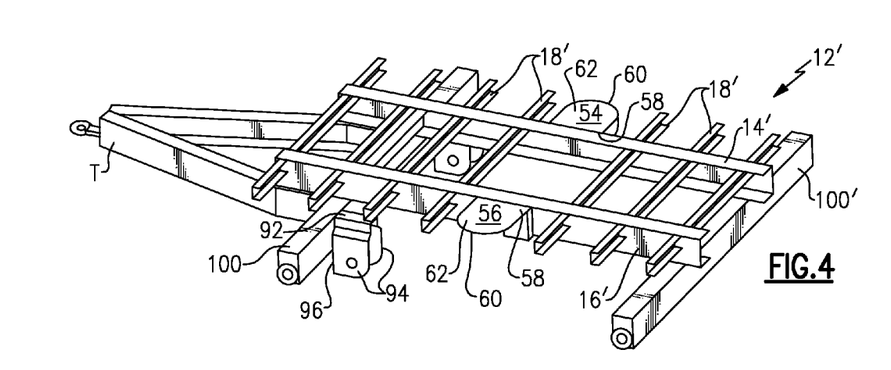
FIG. 4 is a top perspective view of another example of a trailer frame.
Figure 5:
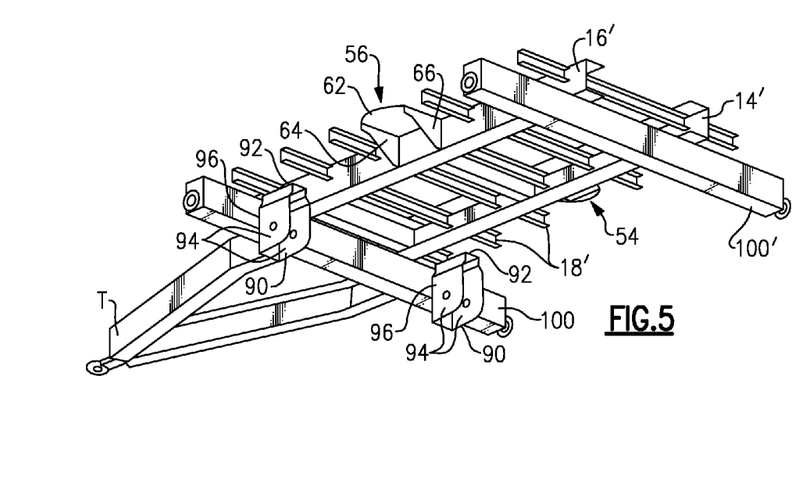
FIG. 5 is a bottom perspective view of the trailer frame of FIG. 4.

As shown in FIGS. 4 and 5, the first 54 and second 56 cantilevered brackets each include a top plate 62 that defines the inboard 58 and outboard 60 ends, and first 64 and second 66 side braces that are longitudinally spaced apart from each other. In this example, the top plate 62 and first 64 and second 66 side braces are mounted to outboard facing sides of the first 14 and second 16 side rails. The brackets shown in these figures are just one example of a bracket structure, it should be understood that other bracket configurations could also be used.

Figure 3:
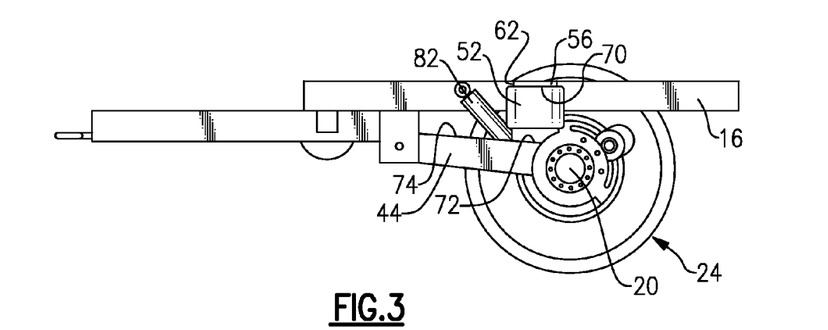
FIG. 3 is a side view of FIG. 2.

As shown in FIGS. 2-3, each air spring 50, 52 includes an upper surface 70 and a lower surface 72. The lower surfaces 72 are supported on respective upper surfaces 74 of the first 42 and second 44 arms in a top mount configuration. The upper surfaces 70 are mounted to downwardly facing surfaces of the top plates 62 of the first 54 and second 56 cantilevered brackets. Any type of mounting structure and hardware can be used to attach the air springs 50, 52 to the top plates, such as fasteners for example.

The suspension assembly 40 also includes first 80 and second 82 shock absorbers that are respectively associated with the first 42 and second 44 arms. In the example shown in FIGS. 1-3, the shock absorbers 80 and 82 are mounted outboard of the first 14 and second 16 side rails. In this configuration, each shock absorber 80, 82 includes a first end 84 that is fixed to an inboard facing surface 86 (FIG. 2) of one of the first 42 and second 44 arms and a second end 88 that is fixed to the outboard facing side of one of the first 14 and second 16 side rails. FIG. 3 shows this outboard mounting configuration of both the second air spring 52 and second shock absorber 82 being located outboard of the second side rail 16.

Hanger brackets 90 are used to mount the second arm ends 48 of the first 42 and second 44 arms to the first 14 and second 16 side rails. As shown in FIGS. 4-5, the hanger brackets 90 include a top plate 92 and a pair of laterally spaced side walls 94 extending downwardly from the top plate 92. An end plate 96 inter-connects the side walls 92 and top plate 92 on one bracket end leaving the opposite end and the bottom of the bracket open. In the example shown in FIGS. 1-3, the end plate 96 is fixed to the cross-rail 18. In an alternate mounting configuration, the hanger bracket could also be mounted to the side rails.

FIGS. 4-5 show another example of a trailer frame 12'. In this example, in addition to the cross-rails 18', the trailer frame 12' also includes at least one sling lifting structure 100 that extends in the lateral direction and is connected to the first 14' and second 16' side rails. The sling lifting structure 100 comprises an interface for attachment to an air-lifting device such that a helicopter can pick up the trailer 10 and air-lift the trailer 10 from one location to another location.

The trailer frame 12' shown in FIGS. 4-5 can also include an additional sling lifting structure 100' that is longitudinally spaced from the sling lifting structure 100, and which is located at a rear of the trailer 10. Also shown in this example configuration are additional cross-rails 18' which further strengthen the frame 12 compared to the configuration shown in FIGS. 1-3. The first 50' and second 52' cantilevered brackets are generally located centrally between the sling structures 100, 100'; however, other mounting locations could also be used. The same hanger brackets 90 are used to connect the second arm ends 48 of the first 42 and second 44 to the frame; however, in this example the hanger brackets 90 are fixed to the sling lifting structure 100.

Figure 6:
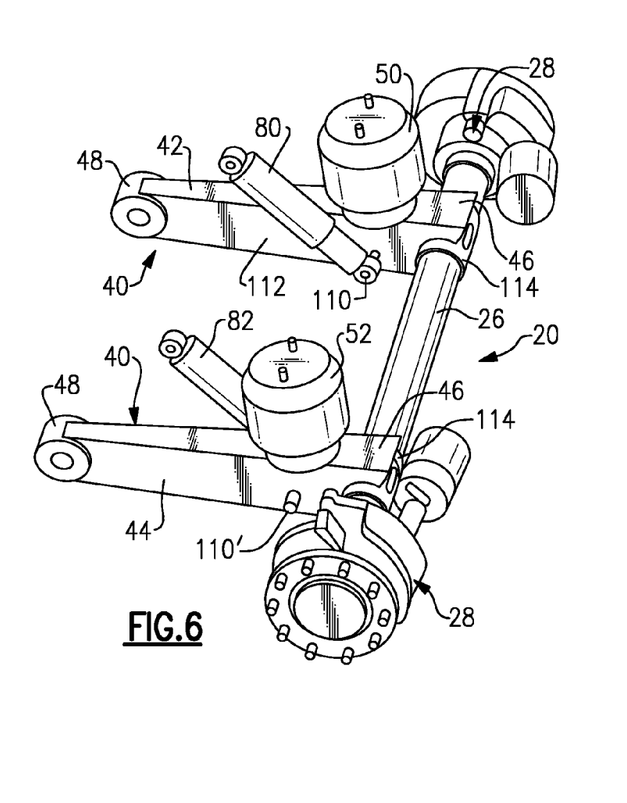
FIG. 6 is a perspective view of a rigid axle and suspension assembly for mounting to the trailer frame of FIG. 5.
Figure 7:
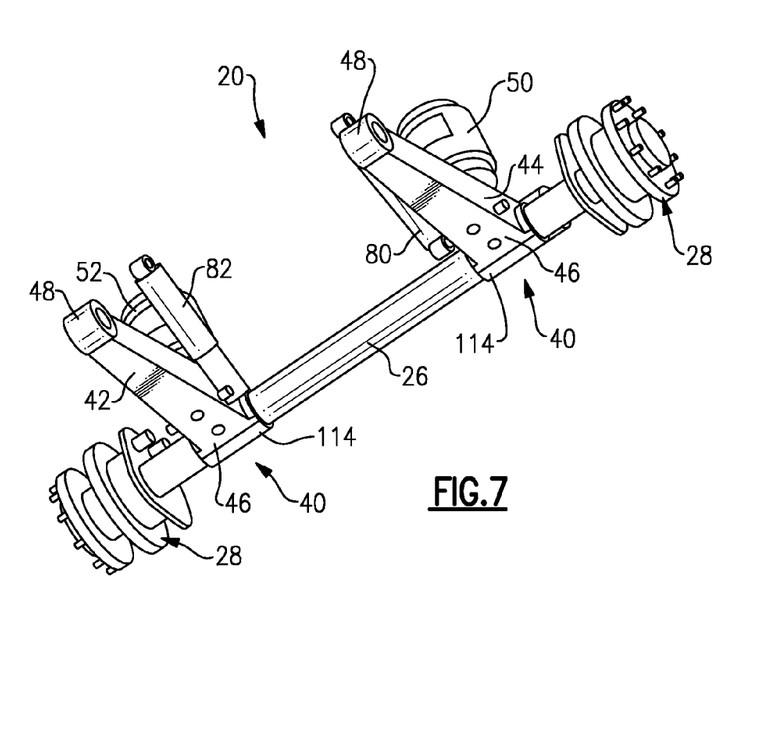
FIG. 7 is a bottom perspective view of the rigid axle and suspension assembly of FIG. 6.
Figure 8:
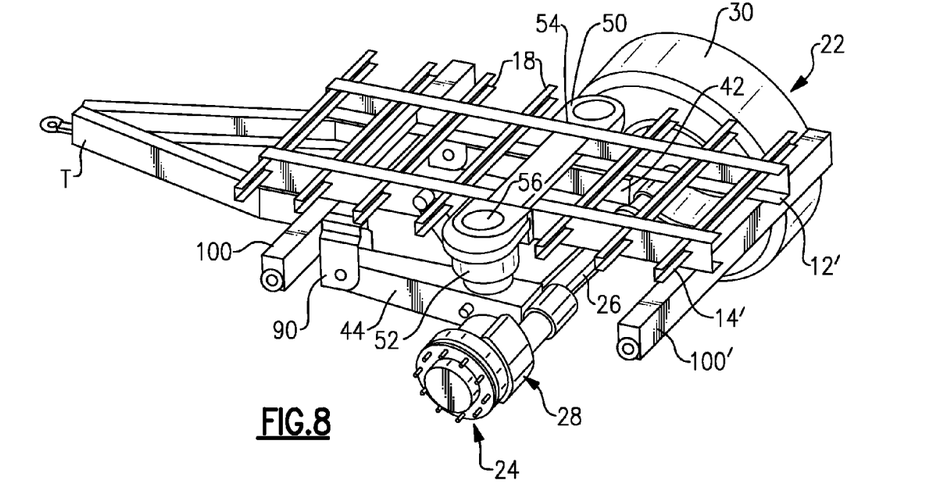
FIG. 8 is a perspective view of the trailer and suspension assembly of FIG. 6 mounted to the trailer frame of FIG. 4 with one tire removed for purposes of clarity.
Figure 9:
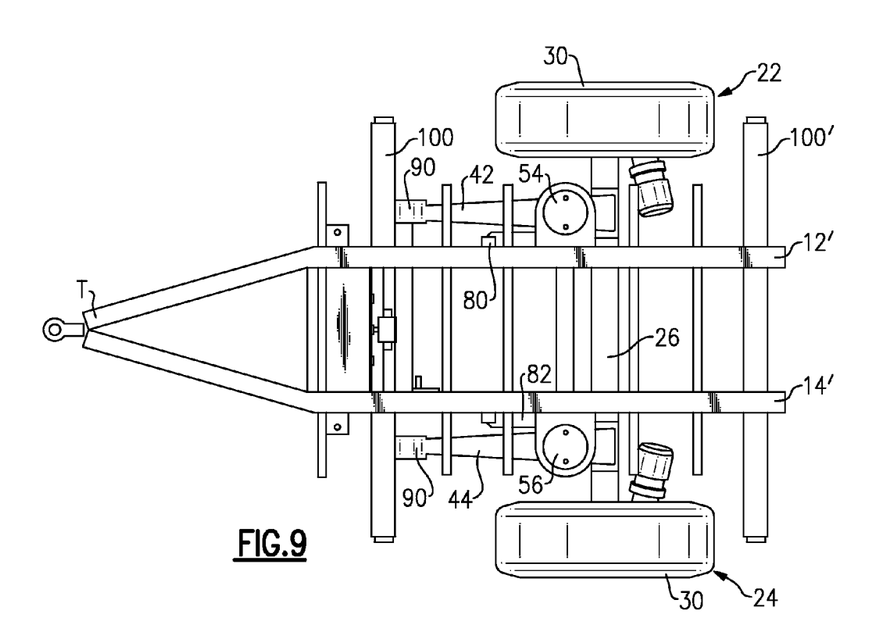
FIG. 9 is a top view of FIG. 8 with both tires installed.
Figure 10:
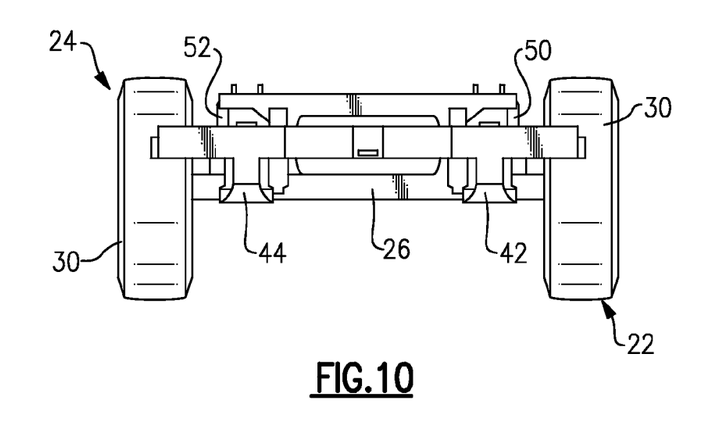
FIG. 10 is an end view of FIG. 9.
Figure 11:
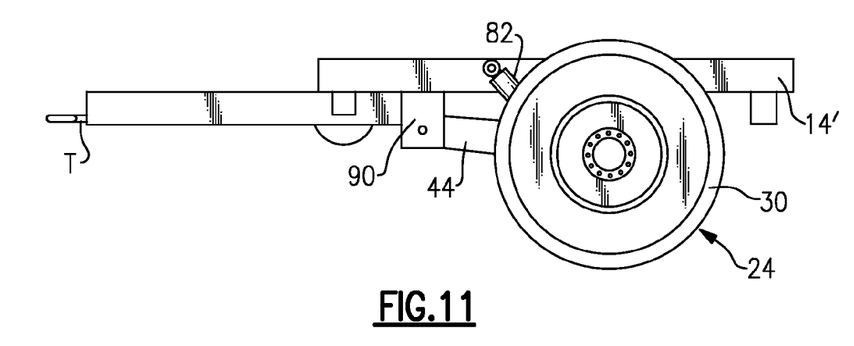
FIG. 11 is a side view of FIG. 9.

FIGS. 6 and 7 show the rigid axle 20 and the suspension assembly 40 in an uninstalled condition. In this example, the shock absorbers 80, 82 are mounted in an inboard mounting configuration. Pivot mounts 110 are located on inboard facing surfaces 112 of the first 42 and second 44 arms. Also shown are optional pivot mounts 110' on the outboard facing surfaces of the first 42 and second arms. The first arm ends 46 of the first 42 and second 44 arms are mounted to the axle tube 26 with axle wraps 114. Other mounting configurations could also be used.

FIGS. 8-11 are similar to FIGS. 1-3 with the exception that the second arm ends 48 of the first 42 and second 44 arms are mounted to the sling lifting structure 100 with hanger brackets 90. In this configuration the first 42 and second 44 arms extend generally parallel to the first 14' and second 16' side rails.

In each of the configurations, the first 12, 12' and second 14, 14' side rails have a lower surface and an upper surface spaced vertically above the lower surface. The first 50, 50' and second 52, 52' cantilevered brackets are configured to be mounted to the upper surface such that an upper surface of the first 50, 50' and second 52, 52' air springs is generally aligned with the upper surface of the first 14, 14' and second 16, 16' side rails. Further, in each of the configurations, the first 50, 50' and said second 52, 52' air springs are longitudinally offset from overlapping with the axle tube 26.

Figure 12:
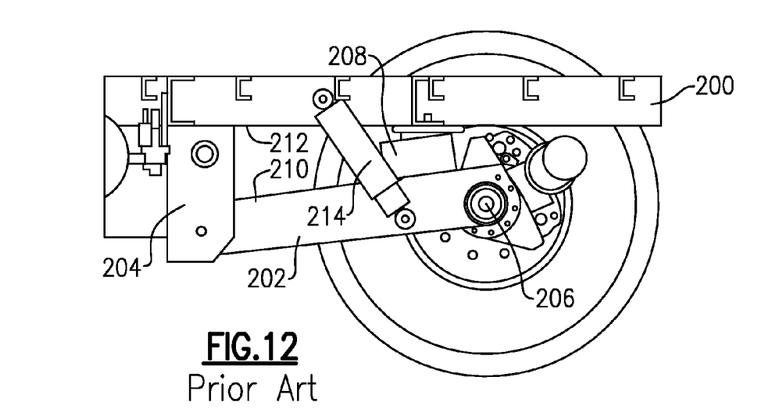
FIG. 12 is a side view of a prior art example of a rigid axle and suspension assembly mounted to a trailer frame and showing an installation position at full jounce.

Positioning the air springs outboard of the side rails of the trailer frame provides several benefits compared to prior configurations. FIG. 12 shows one example of a prior configuration which includes a trailer frame side rail 200 and a suspension arm 202 that is pivotally mounted at one end with a hanger bracket 204 to the side rail 200 and fixed to a rigid axle structure 206 at an opposite end. A lower surface of an air spring 208 is supported on an upper surface 210 of the suspension arm 202. An upper surface of the air spring 208 is mounted to a lower surface 212 of the side rail 200. A shock absorber 214 has one end mounted to an inboard side of the suspension arm 202 and an opposite end mounted to an inboard side of the side rail 200. FIG. 12 shows this traditional trailing arm installation at full jounce, i.e. maximum compression of the wheel toward the frame. In the prior art configuration, there is over seven inches of space still left between the axle and the bottom of the frame.

Figure 13:
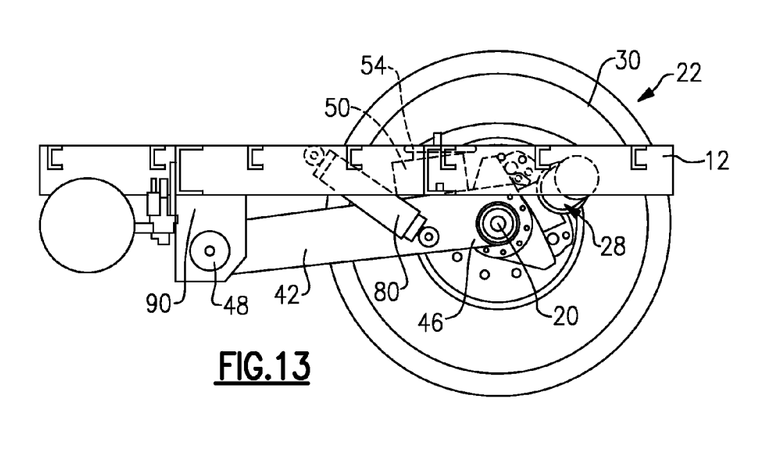
FIG. 13 is a side view of a rigid axle and suspension assembly mounted to a trailer frame and incorporating the subject invention, wherein the installation position is at full jounce and is viewed from an inboard perspective looking at an outboard wheel.

By positioning the air springs outboard of the side rails as shown in FIG. 13, at full jounce there is less than 1.5 inches of available space between the axle and the frame. This makes a much more efficient use of the space, and reduces a cargo center of gravity for cargo being transported by the trailer by six inches. Further, the pivotal connection of the first and second arms can be brought closer to the side rails of the frame, which also simplifies the hanger bracket design as can be seen in the comparisons of the hanger bracket 90 in FIG. 13 with the hanger bracket 204 in FIG. 12. The configurations set forth in FIGS. 1-11 and 13 also provide reduced scrub load stress at the suspension arm to axle connection as compared to the traditional configuration of FIG. 12.

At ride height, i.e. a height between a center of the axle and the bottom of the frame during a normal operating condition, the subject configuration allows the trailer bed height to be lowered compared to prior configurations. This simplifies loading and provides increased rollover resistance without decreasing mobility. Further, the low bed height simplifies the trailer tongue mounting which now may possibly be configured to be an extension of the trailer floor structure.

The cantilevered brackets also provide advantages compared to prior designs without such brackets. The brackets take the input loads from the top of the springs which takes the twisting load out of the trailer structure. Also, trailers that are sling transportable by helicopter can use standard trailing arm suspension with cantilevered air spring supports if the hanger bracket is connected to another structure such as the sling lifting structure as described above.

The subject suspension assembly provides both high suspension travel for mobility in combination with a low bed height for roll stability and ease of cargo loading. The suspension is extremely durable without being excessively heavy, while still also providing the desired amount of ground clearance. By mounting the air springs outside of the trailer frame, i.e. outboard of the side rails, the air springs and the frame occupy the same vertical space without increasing the bed height. Further, as described above, the trailing arm suspension is a top mount configuration so that ground clearance is not sacrificed. The mounting of the air springs outside and next to the trailer frame allows the top mount suspension to achieve ride heights that were previously only possible with "underslung" or low mount suspensions. These types of suspensions cannot be used for the applications described above because underslung suspensions sacrifice ground clearance. An underslung suspension also has problems in these applications because the air spring is behind the axle and is exceptionally tall due to the high travel nature of a military trailer suspension.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A suspension and frame assembly comprising:
   a trailer frame comprising at least first and second side rails and a connector attached to the side rails and configured for connection to a towing vehicle;
   a first arm having one end configured for connection to a rigid axle structure and an opposite end configured for connection to the first side rail at a first frame connection interface;
   a second arm having one end configured for connection to the rigid axle structure and an opposite end configured for connection to the second side rail at a second frame connection interface;
   a first air spring associated with said first arm; and
   a second air spring associated with said second arm, and wherein said first and second air springs are configured to be positioned laterally outboard of the first and second side rails and longitudinally between the rigid axle structure and the first and second frame connection interfaces.

2. The suspension and frame assembly according to claim 1 including a first cantilevered bracket extending outboard of the frame structure on the one lateral side and a second cantilevered bracket extending outboard of the frame structure on the opposite lateral side, and wherein said first air spring is mounted to said first cantilevered bracket and said second air spring is mounted to said second cantilevered bracket.

3. The suspension and frame assembly according to claim 2 wherein the rigid axle structure comprises a rigid beam extending between first and second wheels, and wherein the first and second side rails extend in a longitudinal direction and are laterally spaced apart from each other, and wherein said first cantilevered bracket is configured to be mounted to the first side rail to extend in a direction generally toward the first wheel and said second cantilevered bracket is configured to be mounted to the second side rail to extend in a direction generally toward the second wheel.

4. The suspension and frame assembly according to claim 1 including first and second shock absorbers positioned laterally inboard of said first and second air springs and laterally outboard of said frame structure.

5. The suspension and frame assembly according to claim 1 wherein the first and second side rails extend in a longitudinal direction and are laterally spaced apart from each other, and including a first shock absorber having a first end that is fixed to an inboard facing surface of the first arm and a second end that is fixed to an outboard facing side of the first side rail, and including a second shock absorber having a first end that is fixed to an inboard facing surface of the second arm and a second end that is fixed to an outboard facing side of the second side rail.

6. A suspension and frame assembly comprising:
   a first arm having one end configured for connection to a rigid axle structure and an opposite end configured for connection to one lateral side of a frame structure;
   a second arm having one end configured for connection to the rigid axle structure and an opposite end configured for connection to an opposite lateral side of the frame structure, wherein the rigid axle structure comprises a rigid beam extending between first and second wheels, and wherein the frame structure comprises a trailer frame including first and second side rails that extend in a longitudinal direction and which are laterally spaced apart from each other;
   a first air spring associated with said first arm;
   a second air spring associated with said second arm wherein said first and second air springs are configured to be positioned laterally outboard of the frame structure, wherein the trailer frame includes a sling lifting structure that extends in a lateral direction across the first and second side rails, and wherein said opposite end of said first arm is configured for connection to one end of the sling lifting structure and said opposite end of said second arm is configured for connection to an opposite end of the sling lifting structure;

a first cantilevered bracket extending outboard of the frame structure on the one lateral side; and a second cantilevered bracket extending outboard of the frame structure on the opposite lateral side, and wherein said first air spring is mounted to said first cantilevered bracket and said second air spring is mounted to said second cantilevered bracket, and wherein said first cantilevered bracket is configured to be mounted to the first side rail to extend in a direction generally toward the first wheel and said second cantilevered bracket is configured to be mounted to the second side rail to extend in a direction generally toward the second wheel.

7. A suspension and frame assembly comprising:

a first arm having one end configured for connection to a rigid axle structure and an opposite end configured for connection to one lateral side of a frame structure;

a second arm having one end configured for connection to the rigid axle structure and an opposite end configured for connection to an opposite lateral side of the frame structure, wherein the rigid axle structure comprises a rigid beam extending between first and second wheels, and wherein the frame structure comprises a trailer frame including first and second side rails that extend in a longitudinal direction and which are laterally spaced apart from each other, and wherein said trailer frame includes at least one cross-rail extending in a lateral direction and which is connected to said first and second side rails, and wherein said opposite end of said first arm is configured for connection to one end of said cross-rail and said opposite end of said second arm is configured for connection to an opposite end of said cross-rail;

a first air spring associated with said first arm; and a second air spring associated with said second arm wherein said first and second air springs are configured to be positioned laterally outboard of the frame structure;

a first cantilevered bracket extending outboard of the frame structure on the one lateral side; and a second cantilevered bracket extending outboard of the frame structure on the opposite lateral side, and wherein said first air spring is mounted to said first cantilevered bracket and said second air spring is mounted to said second cantilevered bracket, and wherein said first cantilevered bracket is configured to be mounted to the first side rail to extend in a direction generally toward the first wheel and said second cantilevered bracket is configured to be mounted to the second side rail to extend in a direction generally toward the second wheel.

8. A suspension and frame assembly comprising:

a first arm having one end configured for connection to a rigid axle structure and an opposite end configured for connection to one lateral side of a frame structure;

a second arm having one end configured for connection to the rigid axle structure and an opposite end configured for connection to an opposite lateral side of the frame structure, wherein the rigid axle structure comprises a rigid beam extending between first and second wheels, and wherein the frame structure comprises a trailer frame including first and second side rails that extend in a longitudinal direction and which are laterally spaced apart from each other;

a first air spring associated with said first arm;

a second air spring associated with said second arm wherein said first and second air springs are configured to be positioned laterally outboard of the frame structure;

a first cantilevered bracket extending outboard of the frame structure on the one lateral side; and a second cantilevered bracket extending outboard of the frame structure on the opposite lateral side, and wherein said first air spring is mounted to said first cantilevered bracket and said second air spring is mounted to said second cantilevered bracket, and wherein said first cantilevered bracket is configured to be mounted to the first side rail to extend in a direction generally toward the first wheel and said second cantilevered bracket is configured to be mounted to the second side rail to extend in a direction generally toward the second wheel, and wherein the first and second side rails have a lower surface and an upper surface spaced vertically above the lower surface, and wherein said first and second cantilevered brackets are configured to be mounted to the upper surface such that an upper surface of said first and second air springs is generally aligned with the upper surface of the first and second side rails.

9. The suspension and frame assembly according to claim 8 wherein a lower surface of said first air spring is supported on an upper surface of said first arm and a lower surface of said second air spring is supported on an upper surface of said second arm.

10. An axle, frame, and suspension assembly comprising:

a trailer frame comprising at least first and second side rails and a connector attached to the side rails and configured for connection to a towing vehicle;

a rigid axle structure supporting the trailer frame, said rigid axle structure defining a lateral axis and configured to have a first axle end associated with a first wheel and a second axle end associated with a second wheel;

a first trailing suspension arm having one end fixed to said rigid axle structure adjacent said first wheel and an opposite end adapted for connection to the first side rail at a first frame connection interface;

a second trailing suspension arm having one end fixed to said rigid axle structure adjacent said second wheel and an opposite end adapted for connection to the second side rail at a second frame connection interface;

a first air spring associated with said first trailing suspension arm; and a second air spring associated with said second trailing suspension arm, and wherein said first and second air springs are configured to be positioned laterally outboard of first and second side rails and longitudinally between the rigid axle structure and the first and second frame connection interfaces.

11. The axle, frame, and suspension assembly according to claim 10 wherein said first and said second air springs are longitudinally offset from overlapping with said rigid axle structure.

12. The axle, frame, and suspension assembly according to claim 10 wherein said first and said second trailing suspension arms are generally parallel with each other.

13. The axle, frame, and suspension assembly according to claim 10 wherein said first and second trailing suspension arms are non-parallel with each other.

14. The axle, frame, and suspension assembly according to claim 10 wherein each of said first and second trailing suspension arms includes an upper surface, a lower surface, and side surfaces connecting said upper and lower surfaces, and wherein lower surfaces of said first and second air springs are respectively supported on said upper surfaces of said first and second trailing suspension arms.

15. The axle, frame, and suspension assembly according to claim 14 including first and second shock absorbers positioned laterally inboard of said first and second air springs, said first and second shock absorbers having one end respectively mounted to inboard facing side surfaces of said first and second trailing suspension arms.

16. The axle, frame, and suspension assembly according to claim 10 including a first cantilevered bracket extending outboard of the first side rail and a second cantilevered bracket extending outboard of the second side rail, and wherein said first air spring is mounted to said first cantilevered bracket and said second air spring is mounted to said second cantilevered bracket.

17. The axle, frame, and suspension assembly according to claim 10 wherein said rigid axle structure comprises one of a rigid beam extending between said first and second wheels, a rigid tube extending between said first and second wheels, or an axle housing extending between said first and second wheels.

18. The axle, frame, and suspension assembly according to claim 17 wherein said first trailing suspension arm is positioned laterally inboard of said first wheel and said second trailing suspension arm is positioned laterally inboard of said second wheel.

19. The axle, frame, and suspension assembly according to claim 18 wherein first arm ends of the first and second trailing suspension arms are mounted to the rigid axle structure with axle wraps.

20. An axle, suspension, and frame assembly comprising:
a rigid axle structure defining a lateral axis and configured to have a first axle end associated with a first wheel and a second axle end associated with a second wheel;
a first trailing suspension arm having one end fixed to said rigid axle structure adjacent said first wheel and an opposite end adapted for connection to one lateral side of a frame structure;
a second trailing suspension arm having one end fixed to said rigid axle structure adjacent said second wheel and an opposite end adapted for connection to an opposite lateral side of the frame structure, and wherein the frame structure comprises a trailer frame including first and second side rails that extend in a longitudinal direction and which are laterally spaced apart from each other;
a first air spring associated with said first trailing suspension arm;
a second air spring associated with said second trailing suspension arm wherein said first and second air springs are configured to be positioned laterally outboard of the frame structure;
a first cantilevered bracket extending outboard of the frame structure on the one lateral side; and
a second cantilevered bracket extending outboard of the frame structure on the opposite lateral side, and wherein said first air spring is mounted to said first cantilevered bracket and said second air spring is mounted to said second cantilevered bracket, and wherein said first cantilevered bracket is configured to be mounted to the first side rail and said second cantilevered bracket is configured to be mounted to the second side rail, and wherein said opposite end of said first trailing suspension arm is configured for connection directly to the first side rail and said opposite end of said second trailing suspension arm is configured for connection directly to the second side rail.

21. An axle, suspension, and frame assembly comprising:
a rigid axle structure defining a lateral axis and configured to have a first axle end associated with a first wheel and a second axle end associated with a second wheel;
a first trailing suspension arm having one end fixed to said rigid axle structure adjacent said first wheel and an opposite end adapted for connection to one lateral side of a frame structure;
a second trailing suspension arm having one end fixed to said rigid axle structure adjacent said second wheel and an opposite end adapted for connection to an opposite lateral side of the frame structure, and wherein the frame structure comprises a trailer frame including first and second side rails that extend in the longitudinal direction and which are laterally spaced apart from each other;
a first air spring associated with said first trailing suspension arm;
a second air spring associated with said second trailing suspension arm, wherein said first and second air springs are configured to be positioned laterally outboard of the frame structure;
a first cantilevered bracket extending outboard of the frame structure on the one lateral side; and
a second cantilevered bracket extending outboard of the frame structure on the opposite lateral side, and wherein said first air spring is mounted to said first cantilevered bracket and said second air spring is mounted to said second cantilevered bracket, and wherein said first cantilevered bracket is configured to be mounted to the first side rail and said second cantilevered bracket is configured to be mounted to the second side rail, and wherein the trailer frame includes a sling lifting structure that extends in a lateral direction across the first and second frame rails, and wherein said opposite end of said first trailing suspension arm is configured for connection to one end of the sling lifting structure and said opposite end of said second trailing suspension arm is configured for connection to an opposite end of the sling lifting structure.

22. A trailer comprising:
a trailer frame having at least first and second side rails extending generally in a longitudinal direction, a plurality of cross-rails extending generally in a lateral direction, and at least one sling lifting structure extending across said first and second side rails;
at least one rigid axle assembly defining a lateral axis of rotation and configured to have a first axle end associated with a first wheel and a second axle end associated with a second wheel;
a first trailing suspension arm having one end fixed to said rigid axle assembly adjacent said first wheel and an opposite end connected to said trailer frame at a first frame connection interface;
a second trailing suspension arm having one end fixed to said rigid axle assembly adjacent said second wheel and an opposite end connected to said trailer frame at a second frame connection interface;
a first air spring associated with said first trailing suspension arm; and
a second air spring associated with said second trailing suspension arm, and wherein said first and second air springs are configured to be positioned laterally outboard of said first and second frame rails and longitudinally between the rigid axle structure and the first and second frame connection interfaces.

23. The trailer according to claim 22 including a first cantilevered bracket fixed to said first frame rail and extending outboard of said first frame rail in a direction toward said first wheel end and a second cantilevered bracket fixed to said second frame rail and extending outboard of said second frame rail in a direction toward said second wheel end, and wherein said first air spring is mounted to said first cantilevered bracket and said second air spring is mounted to said second cantilevered bracket.

24. The trailer according to claim 22 wherein the rigid axle assembly comprises a rigid beam extending between said first and second wheels with said first trailing suspension arm being positioned laterally inboard of said first wheel and said second trailing suspension arm being positioned laterally inboard of said second wheel.

25. A trailer comprising:
a trailer frame having at least first and second side rails extending generally in a longitudinal direction, a plurality of cross-rails extending generally in a lateral direction, and at least one sling lifting structure extending across said first and second side rails;
at least one rigid axle assembly defining a lateral axis of rotation and configured to have a first axle end associated with a first wheel and a second axle end associated with a second wheel;
a first trailing suspension arm having one end fixed to said rigid axle assembly adjacent said first wheel and an opposite end connected to said trailer frame;
a second trailing suspension arm having one end fixed to said rigid axle assembly adjacent said second wheel and an opposite end connected to said trailer frame;
a first air spring associated with said first trailing suspension arm;
a second air spring associated with said second trailing suspension arm wherein said first and second air springs are configured to be positioned laterally outboard of said first and second frame rails;
a first cantilevered bracket fixed to said first frame rail and extending outboard of said first frame rail in a direction toward said first wheel end; and
a second cantilevered bracket fixed to said second frame rail and extending outboard of said second frame rail in a direction toward said second wheel end, and wherein said first air spring is mounted to said first cantilevered bracket and said second air spring is mounted to said second cantilevered bracket, and wherein said first and second side rails have a lower surface and an upper surface spaced vertically above said lower surface, and wherein said first and second cantilevered brackets are configured to be mounted to said upper surface such that an upper surface of said first and second air springs is generally aligned with said upper surface of said first and second side rails.

26. The trailer according to claim 23 wherein a lower surface of said first air spring is supported on an upper surface of said first trailing arm assembly and an upper surface of said first air spring is fixed to said first cantilevered bracket, and wherein a lower surface of said second air spring is supported on an upper surface of said second trailing arm assembly and an upper surface of said second air spring is fixed to said second cantilevered bracket, and including a first shock absorber having one end connected to a side wall of said first suspension trailing arm and an opposite end connected to said first frame rail and a second shock absorber having one end connected to a side wall of said second suspension trailing arm and an opposite end connected to said second frame rail.

27. The trailer according to claim 26 wherein said first shock absorber is positioned laterally between said first air spring and said first frame rail and wherein said second shock absorber is positioned laterally between said second air spring and said second frame rail.

* * * * *